United States Patent [19]
Arai et al.

[11] 3,846,747
[45] Nov. 5, 1974

[54] DEVICE FOR DETECTING AND INDICATING QUANTITY OF ENGINE OIL

[75] Inventors: Hiroshi Arai; Jun Ohta; Yasunobu Kikuchi, all of Aichi, Japan

[73] Assignee: Toyota Jidosha Kogyo Kabushiki Kaisha, Toyota, Japan

[22] Filed: Dec. 7, 1973

[21] Appl. No.: 422,766

[30] Foreign Application Priority Data
Aug. 11, 1973  Japan................................ 48-90378

[52] U.S. Cl. ............................... 340/59, 340/244 R
[51] Int. Cl. .......................................... G08b 19/00
[58] Field of Search .......... 340/52 F, 59, 60, 244 R, 340/244 A, 244 B, 244 C, 244 D

[56] References Cited
UNITED STATES PATENTS

| | | | |
|---|---|---|---|
| 2,671,893 | 3/1954 | Van Scoy et al. ................ | 340/60 X |
| 2,994,073 | 7/1961 | Pelovitz ............................ | 340/52 F |
| 3,196,389 | 7/1965 | Heidner ............................. | 340/60 |

Primary Examiner—Alvin H. Waring
Attorney, Agent, or Firm—Karl W. Flocks

[57] ABSTRACT

A device for detecting and indicating the quantity of engine oil in an oil pan of an engine comprising a detecting and indicating circuit including a switching transistor and a indicate element, a first detector applying an output to the circuit when the oil level is stabilized, and a second detector applying an output to the circuit when the oil level is lowered to less than a predetermined level so that the switching transistor is turned on to energize the indicate element in response to the simultaneous application of the outputs of the first and second detectors to the detecting and indicating circuit.

9 Claims, 9 Drawing Figures

DEVICE FOR DETECTING AND INDICATING QUANTITY OF ENGINE OIL

BACKGROUND OF THE INVENTION

This invention relates to devices for detecting and indicating the quantity of engine oil in oil pans of engines, and more particularly to a device of the kind above described which detects the engine oil quantity and gives a visual indicate when the quantity of engine oil in the oil pan is less than required.

Engines used in automotive vehicles and the like include many moving parts, and the friction occurring between these moving parts has been the principal causes giving rise to output losses, wear, seizure of the pistons due to friction heat, etc. In order to alleviate such friction, suitable engine oil is supplied to various moving parts of the engine. Besides the friction alleviating function above described, engine oil provides various other functions including the cooling function for cooling the engine exposed to high temperatures due to combustion heat, etc., the sealing function for sealing the space between the pistons and the cylinders thereby reducing output losses, and the cleaning function for removing solid matters or foreign matters existing in the lubricated portions. Thus, engine oil plays a remarkably important role in the attainment of satisfactory operation of the engine.

The engine oil above described is commonly contained within an oil pan fixed gas-tight to the crank case of the engine and is supplied to various moving parts by an oil pump. With the operation of the engine, the quantity of engine oil contained within the oil pan is gradually decreased due to combustion, leakage or vaporization. An excessive decrease in the quantity of engine oil exerts a serious influence on various functions above described until finally the engine performance will be paralysed. It is therefore very important for the satisfactory operation of the engine to continuously and accurately detect the exact quantity of engine oil in the oil pan.

An oil level gauge has been most widely used heretofore for measuring the quantity of engine oil in the oil pan. According to this prior art practice, the quantity of engine oil in the oil pan is estimated by inserting the oil level gauge into the oil pan and observing the position of oil attaching to the oil level gauge.

However, this prior art oil quantity detecting means has been defective in that the quantity of engine oil cannot be automatically detected and indicated and inspection of the quantity of engine oil cannot be carried out in the driver's compartment. Further, according to this method of inspection, it has been unable to carry out the oil quantity inspection during driving of the vehicle due to the fact that it is necessary to directly insert the oil level gauge into the oil pan. Furthermore, the prior art method has been defective in that accurate measurement of the quantity of engine oil cannot be attained in the state in which the engine is idling due to the fact that the spray of engine oil attaches to the oil level gauge resulting in difficulty of discrimination between the oil level and the spray.

SUMMARY OF THE INVENTION

With a view to obviate the above defects, the present invention contemplates the provision of an improved oil quantity detecting and indicating device in which a switch means actuated depending on the result of detection of the oil level in the oil pan is provided to control an oil quantity detecting and indicating circuit including a indicate element disposed in the vicinity of the driver's seat for giving a visible alarm. The present invention is thus advantageous in that the driver sitting on the driver's seat can continuously watch the quantity of engine oil in the oil pan. Further, according to the present invention, another switch means for detecting stabilization of the oil level in the oil pan is provided for preventing undesirable energization of the indicate element due to termporary lowering of the oil level during, for example, starting of the engine. The provision of such switch means is advantageous in that the quantity of engine oil can be detected and indicated more accurately.

It is an object of the present invention to provide an oil quantity detecting and indicating device which can automatically indicate as to whether engine oil of predetermined quantity is filled in an oil pan.

Another object of the present invention is to provide an oil quantity detecting and indicating device which can automatically indicate as to whether engine oil in the oil pan is filled up to a predetermined oil level.

Still another object of the present invention is to provide an oil quantity detecting and indicating device which can automatically indicate as to whether the predetermined oil level is maintained in the oil pan after the oil level in the oil pan has reached a stable state.

DESCRIPTION OF THE PREFERRED EMBODIMENTS

Figure 1:
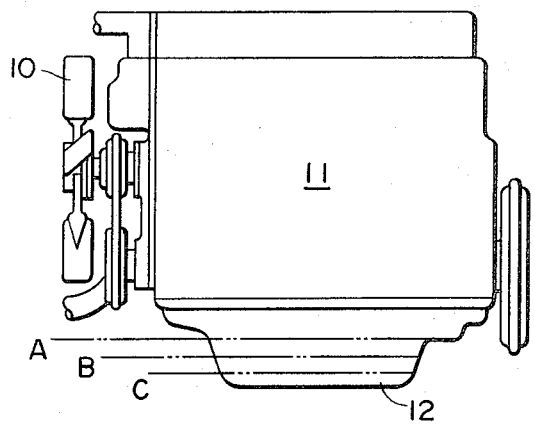
FIG. 1 is a schematic external view of an engine.

Referring to FIG. 1 showing schematically an engine for a vehicle, a cooling fan 10 is rotatably mounted to the engine body 11 and an oil pan 12 is fastened by bolts to the lower part of the engine body 11 with a gasket (not shown) interposed therebetween.

Figure 2:
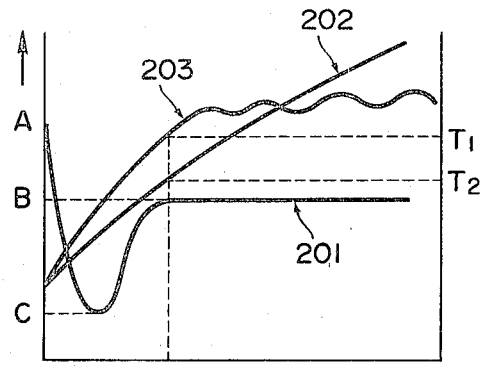
FIG. 2 is a graphic representation of variations of the engine oil level in the oil pan, engine oil temperature and cooling water temperature relative to time.

An engine oil is contained within the oil pan 12. It is known that the oil level in the oil pan 12 when the engine is in operation differs from that when the engine is not in operation, Suppose now that engine oil in the oil pan 12 occupies a level A as shown in FIG. 2 when the engine is not in operation. Upon starting of the engine in such a state, an oil pump is operated with the rotation of the engine and pumps up engine oil from within the oil pan 12 to supply same to various moving parts of the engine. As a result, the oil level in the oil pan 12 is lowered to a level C for a short period of time following the starting of the engine. After the engine oil pumped up by the oil pump has been supplied to the individual moving parts, an excess of the engine oil is returned to the oil pan 12 again. Thereafter, the oil pump acts to circulate successively the engine oil through the moving parts and an equilibrium is reached in the engine lubricating operation by the engine oil. Therefore, the oil level lowered once to the level C is restored to another higher level B in this state of equilibrium. During steady operation of the engine, the level B is lower than the level A since the engine oil is continuously supplied to the moving parts. The difference between the levels A and B is commonly of the order of 10 to 20 mm although it varies depending on the type of the engine and the shape of the oil pan.

Variations of the level of the engine oil and variations of the temperature of the engine oil and coolant relative to time are shown in FIG. 2, in which the curves 201, 202 and 203 represent variations of the engine oil level, engine oil temperature and coolant temperature respectively. It will be apparent from FIG. 2 that starting of the engine at the oil level A results in temporary lowering of the oil level to the level C and then an equilibrium as shown by the level B is reached. In FIG. 2, $T_1$ and $T_2$ represent the engine oil temperature and coolant temperature respectively when the level B is reached.

The period of time required for attaining this equilibrium varies depending on the factors including the viscosity of engine oil and the temperature of the engine. Especially, the temperature of the engine exerts a great influence on the period of time required for attaining the equilibrium. It is empirically known that the equilibrium is reached in several seconds when the engine is started in a sufficiently warmed-up state, but a period of time of several minutes is required when the engine is started in a cold state as in winter. As will be understood from the above description, it is necessary to detect the quantity of engine oil after the engine has been started and an equilibrium has been reached in the oil level in order that the exact quantity of engine oil can be detected. In order to detect the attainment of the equilibrium in the oil level, it is preferable to measure the engine oil temperature, that is, $T_1$ in FIG. 2. In the case of a water-cooled engine, the coolant temperature, that is, $T_1$ in FIG. 2 may be measured to attain the effect similar to that above described.

The present invention provides a device which is suitable for detecting and indicating the quantity of engine oil on the basis of the principle above described. An oil quantity detecting and indicating circuit preferably employed in the present invention will be described with reference to FIG. 3.

Figure 3:
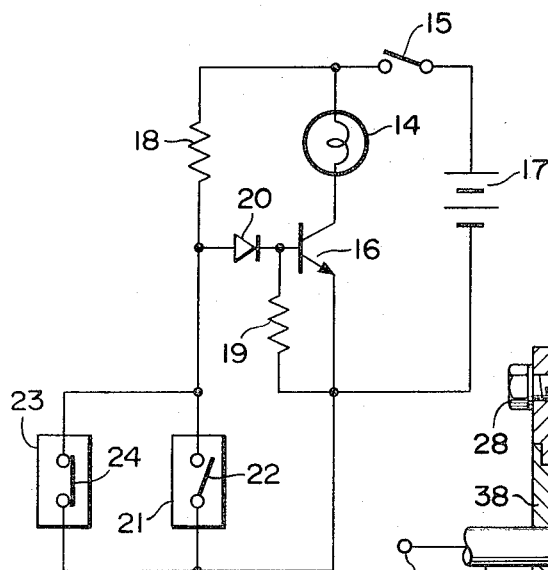
FIG. 3 is a circuit diagram of an embodiment of the oil quantity detecting and indicating device according to the present invention.

Referring to FIG. 3, a indicate lamp 14 is disposed in the vicinity of the driver's seat in a vehicle for giving a visual indicate when the quantity of engine oil in the oil pan 12 is less than that required. This indicate lamp 14 is connected to a battery 17 in the vehicle through an engine key switch 15 and an NPN transistor 16. A series circuit consisting of bias resistors 18, 19 and a level shift diode 20 is connected in parallel with the series circuit consisting of the indicate lamp 14 and NPN transistor 16. The base of the NPN transistor 16 is connected to the connection point between the bias resistor 19 and the level shift diode 20 which are provided for suitably biasing the NPN transistor 16. When the engine key switch 15 is turned on and the voltage of the battery 17 is applied to the NPN transistor 16, the bias circuit applies across the base and emitter of the NPN transistor 16 a bias voltage which is sufficient to cause conduction of the NPN transistor 16. In such a state, therefore, the indicate lamp 14 may be immediately energized in response to the turn-on of the engine key switch 15. However, due to the fact that a by-pass circuit is connected across the base and emitter of the NPN transistor 16 in the oil quantity detecting and indicating circuit according to the present invention, the indicate lamp 14 would not be energized when a proper quantity of engine oil is contained within the oil pan 12.

This by-pass circuit comprises a first detecting switch 22 in an oil level detector 21 and a second detecting switch 24 in an oil level stabilization detector 23, and these detecting switches 21 and 24 are connected in parallel with each other. This by-pass circuit is connected at one end thereof to the emitter of the NPN transistor 16 and at the other end thereof to the connection point between the bias resistor 18 and the level shift diode 20.

The oil level detector 21 is a means for accurately detecting the oil level in the oil pan 12 of the vehicle as described in detail later. The operation of the oil level detector 21 is such that the first detecting switch 22 is closed when a proper oil level is maintained in the oil pan 12, while such switch 22 is opened when the oil level in the oil pan 12 is lower than a predetermined level, that is, when the quantity of engine oil in the oil pan 12 is less than required.

The oil level stabilization detector 23 is a means for detecting as to whether the oil level in the oil pan 12 is stabilized at the level B shown in FIG. 2. Before stabilization of the oil level at the level B, the second detecting switch 24 is in the closed position, while after stabilization of the oil level at the level B, the second detecting switch 24 is urged to the open position.

The oil quantity detecting and indicating circuit described with reference to FIG. 3 detects the oil level in the oil pan 12 in a manner as described below.

When the engine key switch 15 is turned on for starting the engine, the voltage of the battery 17 is applied across the collector and emitter of the NPN transistor 16. However, the second detecting switch 24 in the oil level stabilization detector 23 is kept in the closed position for a predetermined period of time after the starting of the engine. Therefore, the base-emitter voltage of the NPN transistor 16 is limited to less than the threshold voltage of the transistor 16. Thus, the NPN transistor 16 is maintained in the non-conducting state and the indicate lamp 14 is not energized. It is apparent that the oil level varies between the levels A and C as above described during the period of time in which the second detecting switch 24 is kept closed, that is, until the oil level in the oil pan 12 is stabilized at the level B shown in FIG. 2. The first detecting switch 22 in the oil level detector 21 makes unstable on-off operation depending on variations of the oil level. However, due to the fact that the first and second detecting switches 22 and 24 in the by-pass circuit are connected in parallel with each other, the NPN transistor 16 is kept in the non-conducting state when either the first detecting switch 22 or the second detecting switch 24 is in the closed position, and the NPN transistor 16 is controlled solely by the second detecting switch 24 independently of on-off of the first detecting switch 22 until the oil level is stabilized at the level B. Consequently, the indicate lamp 14 is not energized until the oil level in the oil pan 12 is stabilized.

The second detecting switch 24 is opened when the oil level in the oil pan 12 is stabilized. In such a situation, the first detecting switch 22 in the oil level detector 21 is in the closed position when the quantity of engine oil in the oil pan 12 is more than the predetermined value. Therefore, the first detecting switch 22 establishes a by-pass route across the base and emitter of the NPN transistor 16 to limit the base-emitter voltage to less than the threshold voltage so that the NPN transistor 16 is still maintained in the non-conducting state and the indicate lamp 14 is not energized.

On the other hand, when the quantity of engine oil in the oil pan 12 is less than the predetermined value, the first detecting switch 22 in the oil level detector 21 is opened. As a result, the bias voltage of the bias circuit is applied across the base and emitter of the NPN transistor 16 to drive the NPN transistor 16 to the conducting state. Therefore, current is supplied from the battery 17 to the indicate lamp 14 to energize the indicate lamp 14 thereby warning the driver of the fact that the quantity of engine oil in the oil pan 12 is less than required and the engine is in a dangerous state.

It will be understood from the above description that the second detecting switch 24 in the oil level stabilization detector 23 is maintained in the open position after the oil level in the oil pan 12 has been stabilized so that the conduction and non-conduction of the NPN transistor 16 is controlled solely by the first detecting switch 22 in the oil lever detector 21.

One preferred form of the oil level detector 21 will be described with reference to FIG. 4.

Figure 4:
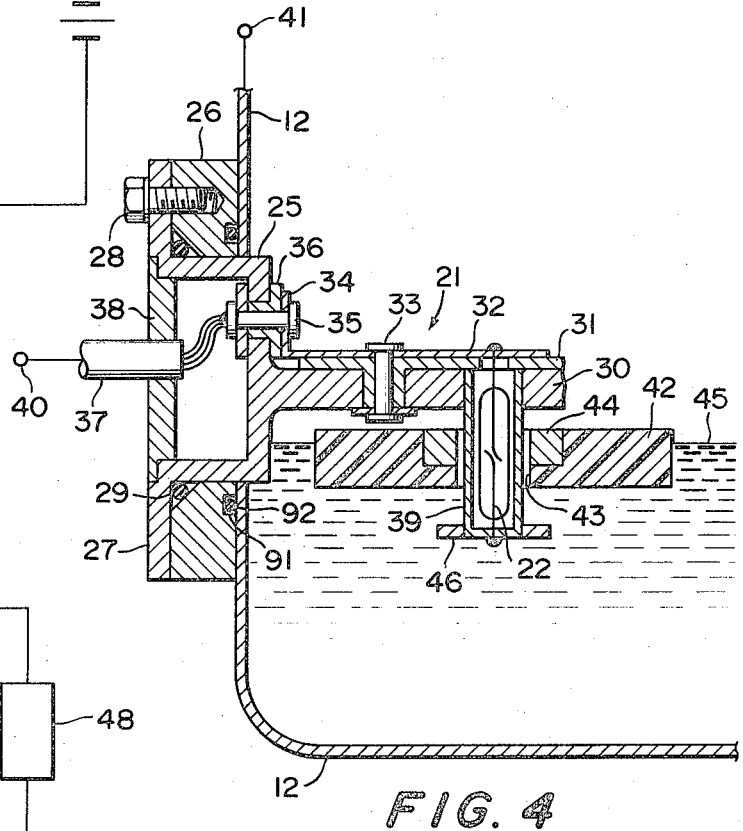
FIG. 4 is a sectional view of one form of the oil level detector used in the device shown in FIG. 3.

Referring to FIG. 4, the oil pan 12 is formed as by cold rolling a steel plate and is provided with an opening 25 bored in the side wall thereof. Adjacent to the opening 25, and annular holding member 26 is rigidly fixed as by welding to the outer surface of the side wall of the oil pan 12. A detector supporting member 27 having a shape as shown is inserted into the opening 25 and is rigidly fixed to the holding member 26 by a plurality of bolts 28. This detector supporting member 27 is made from a light alloy such as an aluminum alloy or magnesium alloy. A sealing member 29 is disposed between the detector supporting member 27 and the holding member 26 to maintain the oil pan 12 gas-tight. The detector supporting member 27 is formed with an integral arm 30 extending inwardly into the oil pan 12 and a conductive member 32 is fixed by a rivet 33 to the upper surface of the arm 30 with a sheet 31 of electrical insulator interposed therebetween. One end portion 34 of the conductive member 32 is bent in the form of an L and this L-shaped end portion 34 is fixed by a rivet 35 to the detector supporting member 27. A bush 36 of electrical insulator is interposed between the L-shaped end portion 34 of the conductive member 32 and the detector supporting member 27 to electrically insulate these members from each other. One end of a lead 37 is fixed as by soldering to one end of the rivet 35 and this lead 37 is supported in a cover 38 mounted to the detector supporting member 27. A cylindrical switch holder 39 of nonmagnetic metal such as brass is fixed to an inner end portion of the arm 30 and extends vertically downward. The first detecting switch 22 which may be a reed switch is fixedly accommodated within the switch holder 39. The reed switch 22 is fixed at one end thereof to the conductive member 32 as by soldering and at the other end thereof to the bottom portion of the switch holder 39 as by soldering. One of the contacts of the reed switch 22 is connected to one terminal 40 through the conductive member 32, rivet 35 and lead 37, while the other conduct of the reed switch 22 is connected to the other terminal 41 through the switch holder 39, detector supporting member 27 and oil pan 12.

A float 42 of foamed plastic is disposed adjacent to the outer periphery of the switch holder 39. This float 42 is substantially disc-like in shape and has a central opening 43 in which the switch holder 39 is loosely received. A cylindrical ferrite magnet 44 is fixed in the inner peripheral portion of the float 42. The holding member 26 is provided with an annular groove 91 in which a sealing member 92 is disposed to prevent leakage of oil from the welded portion between the outer side wall of the oil pan 12 and the holding member 26. The float 42 is floating on the surface of engine oil 45 contained within the oil pan 12, and a stop ring 46 is fixed to the bottom of the switch holder 39 to limit the movement of the float 42 so that the float 42 may not move out of the position associated with the switch holder 39.

The operation of the oil level detector 21 having a structure as shown in FIG. 4 will now be described.

When the quantity of engine oil in the oil pan 12 is more than the predetermined value, the float 42 is in the upper position and the magnet 44 is situated adjacent to the reed switch 22 to close this switch 22. On the other hand, when the quantity of engine oil 45 in the oil pan 12 decreases to less than the predetermined value, the float 42 moves downward to move the magnet 44 away from the reed switch 22 thereby opening this switch 22. The oil level detector 21 shown in FIG. 4 is connected across the base and emitter of the NPN transistor 16 in the detecting and indicating circuit as shown in FIG. 3.

Figure 5:
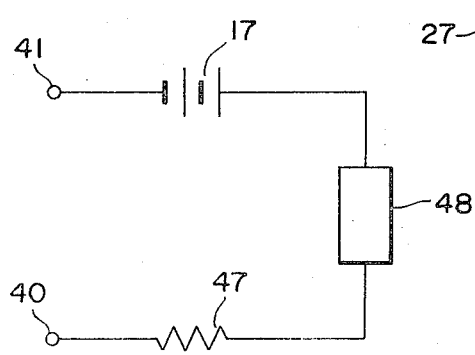
FIG. 5 shows a circuit including another detector which replaces the detector shown in FIG. 4.

In the oil quantity detecting and indicating circuit shown in FIG. 3, the oil level detector 21 is illustrated in a form in which it includes a simple on-off switch. In a modification shown in FIG. 5, a current detector 48 is employed instead of the oil level detector 21, and the battery 17, the current detector 48 and a resistor 47 are connected in series between the terminals 40 and 41. This current detector 48 may be any suitable means such as an electromagnetic relay.

In the embodiment shown in FIG. 3, the indicate lamp 14 is energized when the switch 22 in the oil level detector 21 is opened. This fact can also be utilized for detecting troubles occurring in the electrical system of the oil level detector 21. More precisely, the display lamp 14 is energized when, for example, a disconnection trouble occurs in the lead 37 in FIG. 4. Therefore, it can be known in such a case that a trouble occurs in the oil level detector 21 when the quantity of engine oil in the oil pan 12 is proper.

However, when such an advantage is not required, the oil level detector 21 may be so constructed that the indicate lamp 14 is energized in response to turn-on of the switch 22. In this modification, a known signal inverter may be connected to the oil level detector 21 in the oil quantity detecting and indicating circuit shown in FIG. 3.

The oil level detector shown in FIG. 4 employs a float and a reed switch. In another form of the oil level detector shown in FIG. 6, a self-heating type sensitive element such as a PTC thermistor (posistor) is used.

Figure 6:
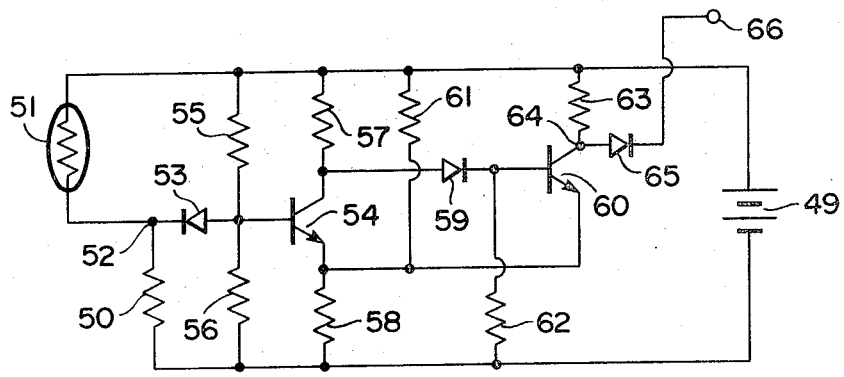
FIG. 6 is a circuit diagram of another form of the oil level detector.

Referring to FIG. 6, a PTC thermistor 51 is connected in series with a battery 49 through a resistor 50. The connection point 52 between the PTC thermistor 51 and the resistor 50 is connected to the base of a transistor 54 through a diode 53, and resistors 55, 56, 57 and 58 are connected to the transistor 54. The collector of the transistor 54 is connected to the base of another transistor 60 through a diode 59 and the emitter of the transistor 54 is connected to the emitter of the transistor 60. The transistor 60 constitutes a Schmidt connection together with resistors 61, 62 and 63 as shown. The collector terminal 64 of the transistor 60 is connected to an output terminal 66 through a diode 65. The PTC thermistor 51 above described is fixed at the predetermined oil level in the oil pan. Therefore, when the oil level in the oil pan is at the predetermined level, heat generated by the PTC thermistor 51 is absorbed by engine oil and the resistance of the PTC thermistor 51 is maintained at a predetermined value. The values of the circuit elements are selected so that the potential at the connection point 52 in this state is enough to turn on the transistor 54. In response to the conduction of the transistor 54, the transistor 60 in the Schmidt connection is turned off as is well known in the art, and as a result, a voltage substantially equal to the voltage of the battery 49 appears at the output terminal 66 connected to the collector terminal 64 of the transistor 60. On the other hand, when the oil level in the oil pan is lowered, the PTC thermistor 51 is not in contact with engine oil and the resistance value thereof increases due to the self-heating action. Therefore, the potential at the point 52 is reduced to cut off the transistor 54 resulting in conduction of the transistor 60. In this state, a voltage substantially equal to the earth potential appears at the output terminal 66. It will be seen that, in the embodiment shown in FIG. 6, an output signal of high or low level appears at the output terminal 66 depending on the oil level and the arrangement delivering such an output signal can be utilized to provide an oil level detector similar to the oil level detector 21 shown in FIG. 3.

The oil level stabilization detector 23 described with reference to FIG. 3 detects stabilization of the oil level in the oil pan. This oil level stabilization detector 23 may be provided in various forms.

It will be apparent from the description given with reference to FIG. 2 that the oil level in the oil pan is stabilized in a certain period of time after the engine has been started. In the case of a water-cooled engine, the period of time required for stabilization of the oil level after the starting of the engine can be known by detecting a predetermined coolant temperature, that is, $T_1$ in FIG. 2. In the water-cooled engine, there are generally a water portion circulating through the engine block side and another water portion remaining in the radiator side, and these two water portions are separated from each other by a thermostat means. The water portion in the engine block side is solely warmed with the starting of the engine. When the water portion in the engine block side is heated up to about 70°C to 80°C, the thermostat means is actuated to allow circulation of this water portion into the radiator side, and thereafter, coolant is circulated by the on-off of the thermostat means for carrying out cooling operation. Therefore, a detector for detecting the coolant temperature may be suitably mounted in either the engine block side or the radiator side. It has been experimentally ascertained that the oil level in the oil pan is stabilized when the coolant temperature reaches about 50°C to 60°C. Therefore, a preferred oil level stabilization detector 23 can be obtained when a temperature sensitive switch, which is opened at a temperature higher than 60°C and is closed at lower temperatures, is disposed in the engine cooling system of the vehicle and this temperature sensitive switch is used as the detecting switch 24 shown in FIG. 3. This temperature sensitive switch is preferably a switch means which is composed of a thermoferrite element whose reluctance is variable depending on temperature variations and a reed switch. Instead of such switch means, a switching circuit utilizing variations of the resistance of a heat sensitive element may also be preferably used.

The temperature sensitive switch of the kind above described is disposed in the engine cooling system. However, the temperature of engine oil in the oil pan, that is, $T_2$ in FIG. 2 may also be detected. In such a case, satisfactory results have been experimentally obtained when the operating temperature of the temperature sensitive switch is set at a value which is about 10°C lower than that used for detection of the coolant temperature.

Figure 7:
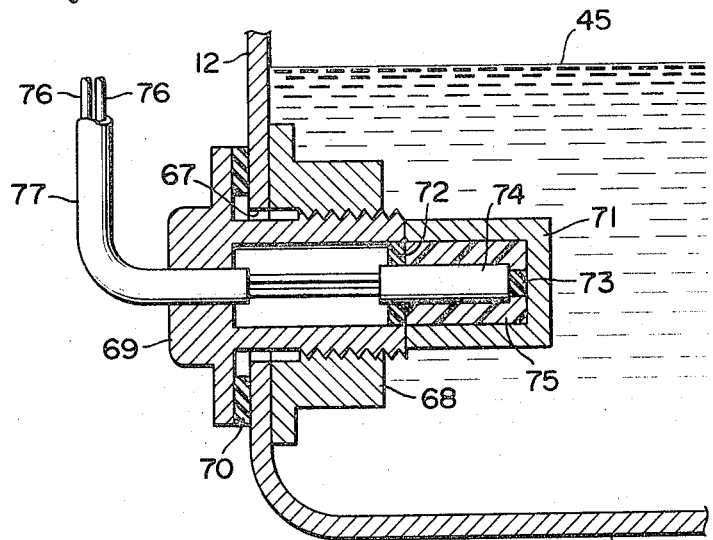
FIG. 7 is a sectional view of an oil level stabilization detector employed in the device according to the present invention.

FIG. 7 shows a detector for detecting the temperature of engine oil. Referring to FIG. 7, an opening 67 is bored in the side wall of the oil pan 12 and an internally threaded, substantially cylindrical member 68 is fixed as by welding to the inner side wall portion around the opening 67 so as to extend inwardly into the oil pan 12. A detector supporting member 69 of metal having a high mechanical strength, which is substantially cylindrical and is externally threaded, is in threaded engagement with the member 68 as shown, and a gasket 70 is interposed between the detector supporting member 69 and the oil pan 12 for ensuring a gas-tight seal. A detector housing 71 is fixed to the inner end of the detector supporting member 69, and a sensor 74 is fixedly supported within the detector housing 71 by a shielding plate 72 and a stay 73. The detector housing 71 is formed from a metal having a satisfactory heat conductivity as it serves to transmit the temperature of engine oil 45 to the sensor 74 and to protect the sensor 74. The sensor 74 may be a switch means which is composed of a thermoferrite element whose reluctance is variable depending on the temperature, a reed switch and a magnet. In this case, the space around the sensor 74 is preferably filled with a resin 75 having a satisfactory heat conductivity and a high resistance to heat. In another preferred form of the sensor 74, a thermistor whose electrical resistance varies greatly with heat and a switching circuit may be employed. In this latter case, it is preferable to provide many perforations in the walls of the detector housing 71 and to remove the resin 75 for permitting admission of engine oil 45 into the detector housing 71 so that the thermistor which has a small heat capacity and a high sensitivity can contact directly with engine oil 45. Leads 76 connected to the sensor 74 are led out of the oil pan 12 through a tube 77 fixed to the detector supporting member 69. The detector above described is preferably disposed in a side wall portion near the bottom of the oil pan 12 since it must be submerged beneath the surface level of engine oil 45. Further, the detector may be disposed on the bottom surface of the oil pan 12. In such a case, however, a suitable shock absorbing and protecting means must be provided to protect the detector from shocks which may be imparted from the ground surface or obstacles. In a simplified form of the engine oil temperature detector, a temperature sensor may be fixed to the end of a conventional level gauge.

Figure 8:
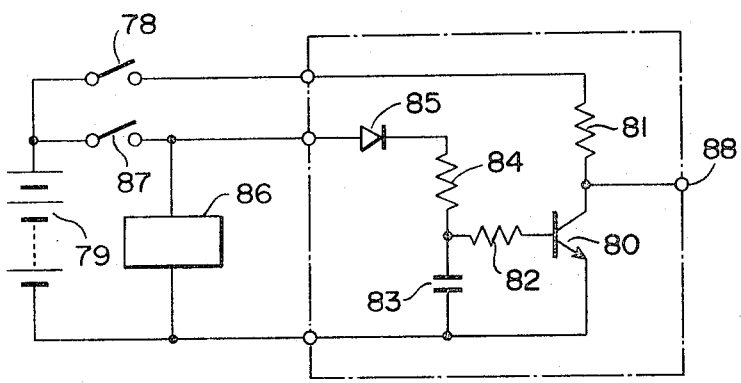
FIG. 8 is a circuit diagram of another form of the oil level stabilization detector.

Stabilization of the oil level in the oil pan can also be detected by a timer which is actuated for a predetermined period of time after the engine has been started. FIG. 8 is a circuit diagram of a timer means having a simple construction. Referring to FIG. 8, a switching transistor 80 and a resistor 81 are connected to a battery 79 through an ignition switch 78. A capacitor 83 is connected to the base of the transistor 80 through a resistor 82 and to a starter means 86 through a resistor 84 and a diode 85. Current is supplied from the battery 79 to the starter means 86 and capacitor 83 through a starter switch 87. In the open position of the starter switch 87, the transistor 80 is maintained in the non-conducting state. In response to turn-on of the starter switch 87 for starting the engine, the capacitor 83 is charged and the base potential of the transistor 80 is increased resulting in conduction of the transistor 80. In this state, therefore, a voltage substantially equal to the earth potential appears at an output terminal 88 connected to the collector of the transistor 80. Although the starter switch 87 is opened in a short period of time, the transistor 80 is kept in the conducting state by the charged capacitor 83. The charge stored in the capacitor 83 is gradually discharged through the resistor 82 and transistor 80 until finally the transistor 80 is rendered non-conducting after a predetermined period of time and a voltage substantially equal to the battery voltage appears at the output terminal 88. The on-off operation of the transistor 80 is controlled by the time constant of the RC circuit consisting of the resistor 82 and capacitor 83. Thus, the output of this circuit can be utilized to detect stabilization of the oil level when the time constant of the RC circuit is selected to be equal to the predetermined period of time required for stabilizing the oil level.

Figure 9:
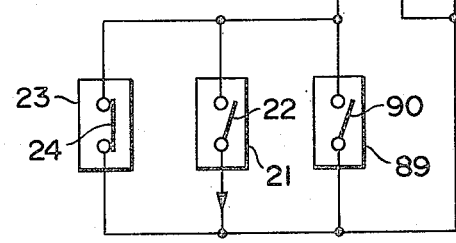
FIG. 9 is a circuit diagram of another embodiment of the oil quantity detecting and indicating device according to the present invention.

FIG. 9 shows another embodiment of the oil quantity detecting and indicating circuit used in the present invention. The arrangement shown in FIG. 9 is substantially similar to that shown in FIG. 3 and like reference numerals are used to denote like parts appearing in FIG. 3. Any detailed description as to the elements similar to those shown in FIG. 3 is thus unnecessary.

Referring to FIG. 9, a detecting switch 90 in a second oil level detector 89 is connected in parallel with a by-pass circuit consisting of a parallel connection of a detecting switch 22 in a first oil level detector 21 and a detecting switch 24 in an oil level stabilization detector 23. Each of the first and second oil level detectors 21 and 89 has a structure as shown in FIG. 4, and these detectors 21 and 89 are disposed on the inner side wall surfaces of the oil pan 12 in a suitably spaced apart relationship so as to prevent any erroneous indicate which may occur when the vehicle body is inclined. More precisely, in the case in which only one oil level detector 21 is provided as shown in FIG. 3, the oil level may be accurately detected when the vehicle body is inclined and the indicate lamp 14 may be erroneously energized even when the quantity of engine oil is more than the predetermined value. Such a drawback is obviated by the arrangement shown in FIG. 9. In FIG. 9, one of the detecting switches 22 and 90 is closed to prevent the indicate lamp 14 from being energized when the vehicle body is inclined so that the oil level detection can be carried out only when the vehicle body is substantially in the horizontal position.

In the embodiments of the present invention, a indicate lamp is illustrated as an example of the indicate element, but it is apparent that any other suitable indicate element such as a light emitting diode may be used.

We claim:

1. A device for detecting and indicating the quantity of engine oil in an oil pan of an engine for vehicles and the like comprising a detecting and indicating circuit including a indicate element and a switching transistor, an oil level stabilization detector for detecting stabilization of the engine oil level in the oil pan after starting of the engine, an oil level detector for detecting lowering of the engine oil level to a level lower than a predetermined level, and means for connecting the outputs of said oil level stabilization detector and said oil level detector to said detecting and indicating circuit, whereby said switching transistor is turned on to energize said indicate element when the outputs of both said detectors are simultaneously applied to said detecting and indicating circuit.

2. An oil quantity detecting and indicating device as claimed in claim 1, wherein said oil level detector comprises a reed switch fixedly mounted within the oil pan and a float floating on the surface of engine oil contained in said oil pan, said float having a magnet disposed adjacent to said reed switch.

3. An oil quantity detecting and indicating device as claimed in claim 1, wherein said oil level detector comprises a temperature sensitive semiconductor fixedly mounted within the oil pan.

4. An oil quantity detecting and indicating device as claimed in claim 1, wherein said oil level stabilization detector comprises a temperature sensitive switch for detecting the temperature of a coolant.

5. An oil quantity detecting and indicating device as claimed in claim 1, wherein said oil level stabilization detector comprises a temperature sensitive switch for detecting the temperature of an engine oil.

6. An oil quantity detecting and indicating device as claimed in claim 4, wherein said temperature sensitive switch is a switch means which comprises a thermoferrite element and a reed switch.

7. An oil quantity detecting and indicating device as claimed in claim 4, wherein said temperature sensitive switch comprises a heat sensitive element whose resistance value is variable depending on the temperature.

8. An oil quantity detecting and indicating device as claimed in claim 1, wherein said oil level detector comprises a first switch means, while said oil level stabilization detector comprises a second switch means, said first and second switch means being connected in parallel with each other, and said parallel connection of said first and second switch means is connected across the base and emitter of said switching transistor to serve as a by-pass circuit.

9. An oil quantity detecting and indicating device as claimed in claim 7, wherein a third switch means is connected in parallel with said first and second switch means in said by-pass circuit so as to prevent an erroneous indicate due to inclination of the vehicle body.

* * * * *